Nov. 20, 1928.
J. F. O'CONNOR
1,692,688
FRICTION SHOCK ABSORBING MECHANISM
Filed May 21, 1927   2 Sheets-Sheet 1
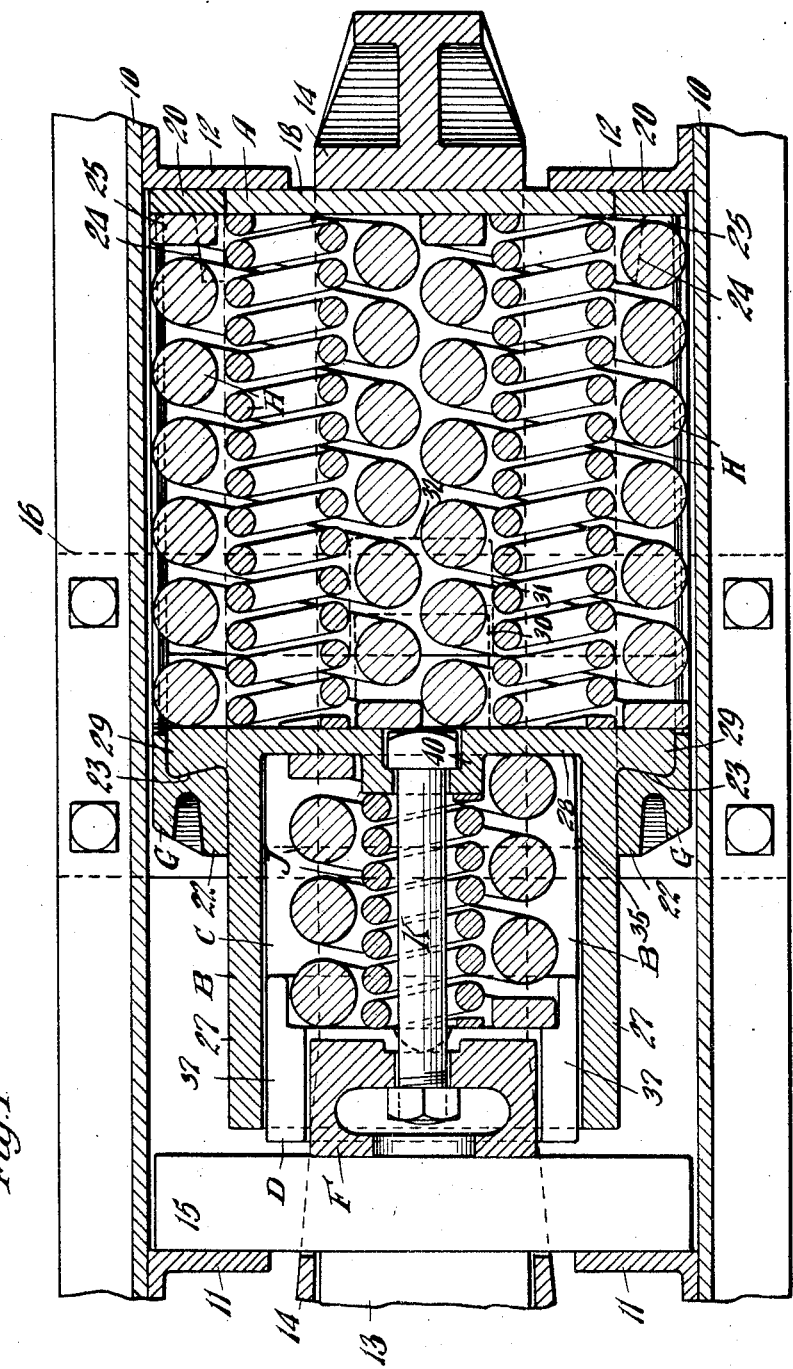

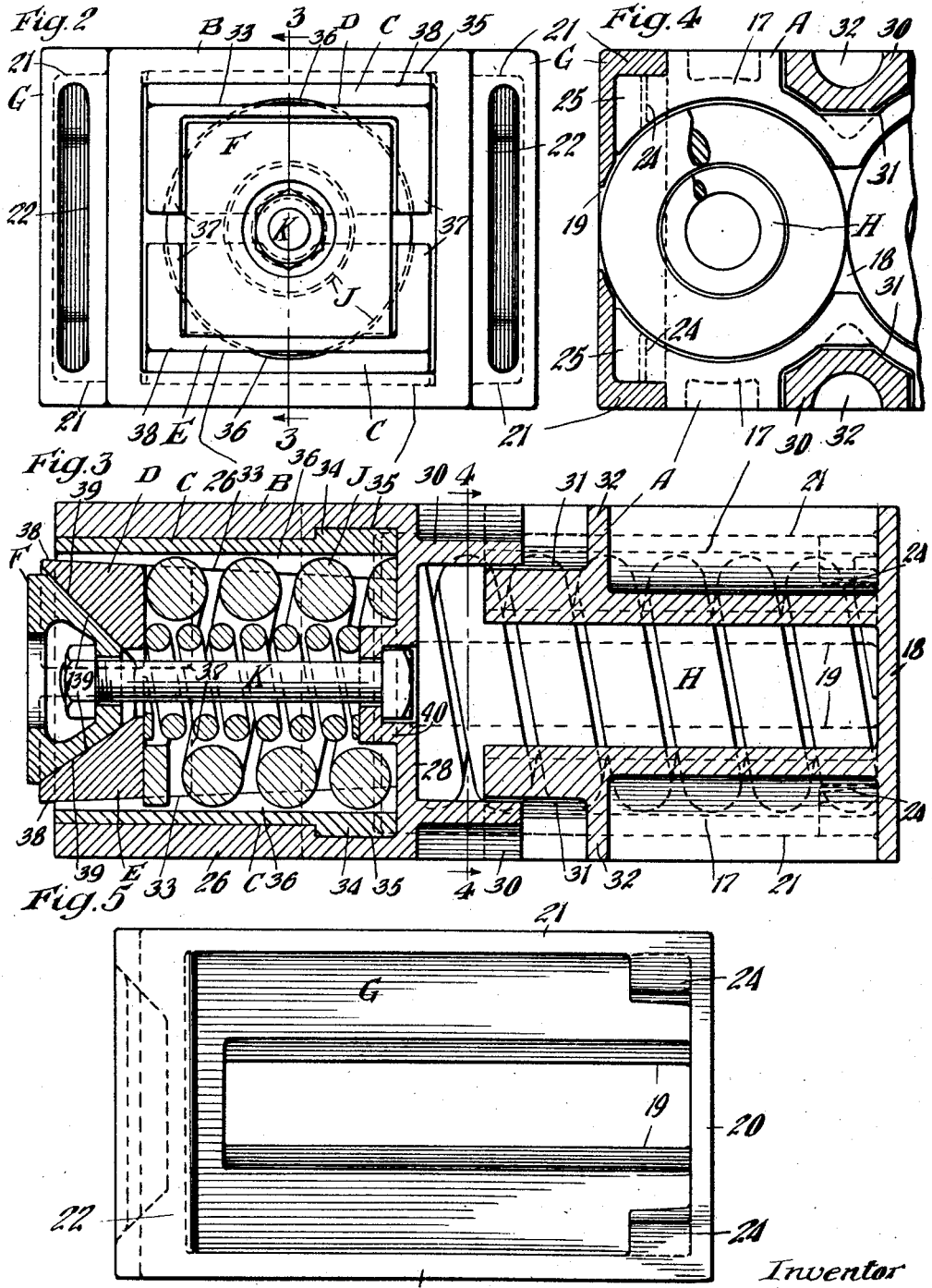

Patented Nov. 20, 1928.

1,692,688

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed May 21, 1927. Serial No. 193,345.

This invention relates to improvements in friction shock absorbing mechanisms.

One object of the invention is to provide a friction shock absorbing mechanism especially adapted for railway draft riggings and having relatively high initial, purely spring action followed by frictional resistance during the latter part of the compression stroke, wherein the means for providing the frictional resistance comprises a friction shell and co-operating friction elements, the shell being relatively movable to a spring cage containing the main spring resistance, retaining means being provided for anchoring the shell to the spring cage and comprising anchoring elements forming a part of the spring cage.

Another object of the invention is to provide a friction shock absorbing mechanism of the character indicated, including a spring cage and a relatively movable friction shell, said shell and cage having limited movement to provide purely spring resistance during the first part of the compression stroke followed by heavier frictional resistance, the shell being anchored to the cage by retaining means forming the side walls of the spring cage.

Other objects and advantages of the invention will more clearly appear from the description and claims hereinafter following.

In the drawings forming a part of this specification, Figure 1 is a horizontal, longitudinal, sectional view of a portion of a railway draft rigging showing my improvements in connection therewith. Figure 2 is a front end elevational view of the shock absorbing mechanism proper. Figure 3 is a longitudinal, vertical, sectional view corresponding substantially to the line 3—3 of Figure 2. Figure 4 is a transverse, vertical, sectional view, partly broken away, corresponding substantially to the line 4—4 of Figure 3. And Figure 5 is an inner side elevational view of one of the retaining members of my improved mechanism.

In said drawings, 10—10 indicate channel shaped center or draft sills of a railway car underframe, to the inner sides of which are secured the usual front stop lugs 11—11 and rear stop lugs 12—12. The inner end of the drawbar is designated by 13, to which is operatively connected a yoke 14 of well known form. The shock absorbing mechanism proper, as well as a front main follower 15, are disposed within the yoke, the yoke, in turn, being supported by a detachable saddle plate 16 secured to the draft sills.

My improved shock absorbing mechanism proper, as shown, comprises broadly, a spring cage A; a friction shell B; liners C—C; friction shoes D and E; a wedge block F; a pair of retainer elements G—G; a main spring resistance H; an additional spring resistance J; and a retainer bolt K.

The spring cage A is of substantially rectangular box-like form having longitudinally extending top and bottom walls 17—17 and a transverse rear end wall 18. The end wall 18 cooperates with the stop lugs 12 in the manner of the usual rear follower. The side walls of the spring cage are formed by the retaining elements G. Each of the retaining elements is in the form of a relatively heavy plate-like member cut out along its longitudinal center line as indicated at 19 to accommodate the outer side of the corresponding element of the main spring resistance H. At the rear end, each element G is provided with a vertical flange 20. The retaining element G is also provided with longitudinally extending top and bottom flanges 21—21 which form continuations of the corresponding top and bottom walls of the cage when the parts are assembled. At the forward end, the retaining element G is laterally enlarged on the inner side as indicated at 22 thereby providing an overhanging abutment member. The abutment member 22 is cut away on the inner side at the rear portion thereof as indicated at 23 for a purpose hereinafter specified. At the rear end, the element G is provided with top and bottom retaining lugs 24—24 which are formed integral with the top and bottom and end flanges of the retaining element G and are adapted to engage behind corresponding lugs 25—25 projecting from the top and bottom wall sections of the spring cage A. Upon reference to the drawings, it will be seen that the lugs 24 provide hook-like retaining members which inter-engage with the lugs 25 of the cage to limit the forward and lateral outward movement of the corresponding retaining element. As most clearly shown in Figures 3 and 4, the spring cage A has the inner surfaces of the top and bottom walls thereof so formed as to substantially correspond to the contour of the spring resistance elements so as to closely embrace the same. It will be evident that an exceedingly rugged construction of spring cage is thus provided, thereby giving exceptionally great column strength.

The friction shell B is also in the form of a substantially rectangular box-like member having horizontally disposed, longitudinally extending top and bottom walls 26—26; longitudinally extending, vertically disposed side walls 27—27 and a transverse rear end wall 28. As most clearly shown in Figure 1, the spring cage A is of greater width than the friction shell and the end wall 28 of the friction shell B is extended laterally beyond the side walls thereof, thus providing vertical flanges 29—29 which engage behind the enlargements 22 of the retaining elements G. The flanges 29 are undercut at the forward side, as clearly illustrated in Figure 1, to properly mate with the abutment faces on the enlargements 22. The top and bottom walls of the friction shell B are extended rearwardly as most clearly illustrated in Figures 3 and 4, thereby providing top and bottom arms 30 which work in cut-away sections 31—31, in the top and bottom walls of the spring cage, said cut-away sections forming guideways for the arms 30 of the friction shell. At the inner ends, the guideways 31 present transverse abutment faces 32 which cooperate with the inner ends of the arms 30 to positively limit the rearward movement of the friction shell with respect to the spring cage. Upon reference to Figure 4, it will be seen that the guide arms 30 of the friction shell cooperate with the side walls of the guideways 31 of the spring cage in such a manner as to prevent lateral movement of the friction shell with respect to the spring cage while permitting limited longitudinal movement of these elements.

The top and bottom walls of the friction shell are provided with liners C—C, presenting inwardly converging, opposed, longitudinally extending friction surfaces 33—33 which cooperate with the friction-shoes D and E, respectively. As illustrated in Figure 3, each of the liners 33 is provided with a lateral enlargement 34 at the rear end thereof, seated in a cooperating recess 35 in the corresponding wall of the friction shell. As will be evident, when the parts are assembled, the enlargements 34 hold the liners in position, preventing longitudinal movement thereof with respect to the friction shell. On the inner sides, the liners are cut away on the longitudinal center to provide concave recesses 36 which accommodate the corresponding sides of the outer coil of the spring resistance element J.

The friction shoes which are two in number are disposed at the top and bottom of the friction shell, the top shoe being designated by D and the bottom shoe by E. The two shoes D and E are of similar design, except as hereinafter pointed out. Each shoe is provided with lateral inwardly extending flanges 37—37 on the inner side thereof adapted to overhang the central wedge block F. On the outer side, each shoe is provided with a longitudinally disposed flat friction surface 38 cooperating with the friction surface 33 of the corresponding liner C. On the inner side, each shoe is provided with a wedge face 39, adapted to cooperate with the wedge block F. The wedge face 39 of the shoe D is disposed at a relatively blunt releasing angle with respect to the longitudinal axis of the mechanism while the wedge face of the shoe E is disposed at a relatively keen wedge-acting angle with respect to said axis. At the inner ends, the shoes are cut away to accommodate the forward end portion of the spring resistance J.

The wedge F is in the form of a relatively heavy block having a flat front end face bearing directly on the inner side of the main follower 15. At the inner end, the wedge block F is provided with inwardly converging top and bottom wedge faces 139—139, the wedge faces 139 co-operating respectively with the wedge faces 39 of the wedge blocks D and E and being correspondingly inclined to the same.

The main spring resistance H comprises twin arranged elements at opposite sides of the mechanism, each element including a relatively heavy outer coil and a lighter inner coil, having their front and rear ends bearing respectively on the rear end wall 28 of the friction shell and the rear end wall 18 of the spring cage A. As clearly shown in Figure 1, the outer coils of the twin arranged spring resistance elements also bear on the end flanges 20 of the retaining elements G.

The additional spring resistance element J, which is disposed within the friction shell, comprises a relatively heavy outer coil and a lighter inner coil, both having their front ends bearing on the rear ends of the friction shoes D and E. The rear end of the outer coil bears directly on the end wall 28 of the friction shell, while the rear end of the inner coil bears on a forwardly projecting hollow boss 40.

The friction elements are held assembled with the friction shell by the retainer bolt K which extends through the inner coil of the spring resistance J, having its head anchored in the hollow boss 40 and the nut thereof disposed within an opening 41 in the wedge block F. The retainer bolt K, in addition to holding the parts assembled, also provides means for maintaining the spring resistance J under initial compression. The retainer bolt may be adjusted to predetermined length to maintain the mechanism of uniform overall dimensions. Compensation for wear of the various friction and wedge faces is had by the expansive action of the spring resistance J, which, as hereinbefore pointed out, is placed under initial compression when the mechanism is assembled.

In assembling the mechanism, the main spring resistance elements H are disposed within the spring cage, the friction shell B, with which the friction elements and spring resistance J have been previously assembled, is then entered into the spring cage through the forward end thereof. The springs H are then compressed by forcing the shell inwardly until the flanges 29 are so positioned with respect to the rear end wall 18 of the spring cage that the side retaining elements G may be placed in position with the lugs 24 thereof in engagement with the retaining lugs 25 of the cage and the enlargements 22 at the forward ends of the retaining elements in overhanging relation to the flanges 29 of the friction shell. Upon removing the compressing force, the friction shell will be projected outwardly, thereby engaging the abutment faces on the flange 29 behind the overhanging abutment faces of the enlargements 22 of the elements G, holding the latter in position against lateral spreading.

In the operation of my improved shock absorbing mechanism, during a compression stroke, the wedge block F will be forced inwardly thereby setting up a wedging action between the same and the friction shoes D and E, forcing the latter into tight frictional engagement with the walls of the friction shell B. Due to the friction thus created between the friction shoes and the shell, the shell will be forced inwardly in unison with the wedge block F thereby compressing the main spring resistance H without any substantial relative movement of the friction shoes and shell B. This action will continue until the inner ends of the friction shell come into engagement with the abutment faces at the front ends of walls 17 of the spring cage, whereupon inward movement of the friction shell will be positively limited. Upon movement of the friction shell being limited, the friction shoes D and E will be compelled to move inwardly on the friction surfaces of the shell B against the resistance of the spring J. It will be evident that during the last named action of the mechanism, the resistance will be greatly augmented due to the friction created. Upon removal of the actuating force during release of the mechanism, the main spring resistance H will force the friction shell outwardly while the expansive action of the additional spring resistance J will force the shoes D and E and the wedge block F outwardly with respect to the friction shell B. Outward movement of the friction shell will finally be limited by engagement of the flanges 29 thereof with the enlargements 22 of the retaining elements J. Outward movement of the friction shoes with respect to the shell B will be limited by the wedge block F being arrested in its movement through the medium of the retainer bolt K.

While I have herein shown and described what I now consider the preferred manner of carrying out my invention, the same is merely illustrative and I contemplate all changes and modifications that come within the scope of the claims appended hereto.

I claim:

1. In a friction shock absorbing mechanism, the combination with a spring cage having detachable side wall sections, said side wall sections having overhanging retaining portions at the forward end thereof; of a friction shell, said shell and cage being relatively movable to a limited extent, said shell having means thereon engaging behind said overhanging portions of the side wall sections for limiting outward movement of the shell with respect to the cage; friction means cooperating with the shell; and spring resistance means opposing movement of the friction means and movement of the shell with respect to the spring cage.

2. In a friction shock absorbing mechanism, the combination with a spring cage having detachable wall sections, said wall sections having limiting means at the forward end thereof; of a friction shell, said shell and cage being relatively movable to a limited extent, said shell having means thereon cooperating with the limiting means of the detachable wall sections and the cage to positively limit outward movement of the shell with respect to the cage; friction shoes co-operating with the friction surfaces of the shell; a wedge block having wedging engagement with the shoes; a main spring resistance opposing relative movement of the friction shell and spring cage; and an additional spring resistance within the friction shell opposing relative movement of the friction shoes and shell.

3. In a friction shock absorbing mechanism, the combination with a spring cage; of a relatively movable friction shell, said spring cage and friction shell having inter-engaging guiding means thereon to prevent lateral displacement of the shell with respect to the cage; detachable wall sections on the cage for anchoring the friction shell thereto for limited relative movement; abutment means on the cage for limiting movement of the shell inwardly of the cage; friction elements co-operating with the shell; and spring resistance means opposing relative movement of the shell and cage and relative movement of the friction elements and shell.

4. In a friction shock absorbing mechanism, the combination with a spring cage; and a friction shell, said shell and cage being relatively movable to a limited extent longitudinally of the mechanism; anchoring means for connecting the shell to the cage comprising members forming side walls of the spring cage, each of said members having a laterally overhanging lug adapted to cooperate with the flanges on the friction shell to anchor the same to the spring cage; friction means co-operating with the friction shell; and spring resistance means for opposing relative movement of the friction elements and shell and relative movement of the shell and spring cage.

5. In a friction shock absorbing mechanism, the combination with a friction shell and friction elements co-operable therewith; of a spring cage; a main spring resistance within said cage, said shell and cage having a predetermined amount of lost motion therebetween, said shell and elements being movable bodily as a unit relative to the cage to effect compression of the main spring resistance to the extent of said lost motion; spring resistance means within the friction shell opposing relative movement of the shell and friction elements; and retaining means enclosing the main spring resistance of the spring cage for holding the friction shell and spring cage assembled.

6. In a friction shock absorbing mechanism, the combination with a rectangular friction shell having interior longitudinally disposed friction surfaces; friction-shoes co-operating with the friction surfaces of the shell; a wedge block engaging said shoes; a spring resistance disposed within the shell opposing inward movement of the friction-shoes; a spring cage having a lost motion connection with the friction shell; a main spring resistance within the spring cage; and retaining means embracing said main spring resistance for anchoring the friction shell to the spring cage.

7. In a friction shock absorbing mechanism, the combination with a friction shell having a rear end wall; friction elements co-operating with the friction shell; a spring resistance interposed between the end wall of the shell and the friction elements; a spring cage; spring resistance means within the cage opposing relative movement of the cage and shell; and retaining means anchored to the rear end of the spring cage and co-operating with flanges at the inner end of the friction shell to hold the shell and cage assembled and connect the same for limited relative movement.

In witness that I claim the foregoing I have hereunto subscribed my name this 17th day of May, 1927.

JOHN F. O'CONNOR.